United States Patent
Frenzel et al.

(10) Patent No.: US 11,095,330 B2
(45) Date of Patent: Aug. 17, 2021

(54) SPRING-LOADED FALL PROTECTOR FOR PREVENTING A MOBILE TERMINAL DEVICE FROM FALLING

(71) Applicant: Frenzel + Mayer Solutions GbR, Aalen (DE)

(72) Inventors: Philip Frenzel, Auernheim (DE); Peter Mayer, Aalen (DE)

(73) Assignee: Frenzel+Mayer Solutions GbR, Aalen (DE)

( * ) Notice: Subject to any disclaimer, the term of this patent is extended or adjusted under 35 U.S.C. 154(b) by 0 days.

(21) Appl. No.: 16/693,219

(22) Filed: Nov. 22, 2019

(65) Prior Publication Data

US 2020/0091952 A1    Mar. 19, 2020

Related U.S. Application Data

(63) Continuation of application No. PCT/EP2019/055080, filed on Feb. 28, 2019.

(30) Foreign Application Priority Data

Mar. 7, 2018    (DE) .................... 10 2018 105 199.9

(51) Int. Cl.
    *H04B 1/38*         (2015.01)
    *H04B 1/3888*    (2015.01)
    *H04M 1/18*        (2006.01)
(52) U.S. Cl.
    CPC ........... *H04B 1/3888* (2013.01); *H04M 1/185* (2013.01)
(58) Field of Classification Search
    CPC .... H04B 1/3888; H04B 1/3833; H04M 1/185
    See application file for complete search history.

(56) References Cited

U.S. PATENT DOCUMENTS

| 7,059,182 | B1* | 6/2006 | Ragner | ................ | H05K 5/0086 73/200 |
| 9,715,257 | B2 | 7/2017 | Manullang et al. | | |
| 2012/0168271 | A1* | 7/2012 | Ryaboy | ............... | G01M 5/0066 188/379 |
| 2015/0108030 | A1* | 4/2015 | Yin | ......................... | A45C 11/00 206/521 |
| 2015/0212336 | A1* | 7/2015 | Hubert | ..................... | G02B 7/08 348/208.11 |
| 2015/0331456 | A1* | 11/2015 | Moon | .................... | H04M 1/185 361/51 |
| 2016/0211878 | A1* | 7/2016 | Pelster | .................... | H04M 1/04 |

(Continued)

OTHER PUBLICATIONS

International Search Report of the European Patent Office in PCT/EP2019/055080 (from which this application claims priority) dated May 13, 2019 and English-language translation thereof.

*Primary Examiner* — Md K Talukder
(74) *Attorney, Agent, or Firm* — Falk Ewers; Ewers IP Law PLLC

(57) ABSTRACT

A housing for an electronic device includes at least one damping unit which is movable between a retracted position and an extended position, the damping unit including a spring and a damper, at least one sensor which is configured to detect a fall of the electronic device, a release unit which is configured to cause the at least one damping unit to move from the retracted position to the extended position when the fall is detected, the spring and the damper being configured to change their shape when moving from the retracted position to the extended position.

19 Claims, 8 Drawing Sheets

(56) References Cited

U.S. PATENT DOCUMENTS

| | | | |
|---|---|---|---|
| 2016/0234356 A1* | 8/2016 | Thomas | ............... H04B 1/3838 |
| 2017/0155416 A1 | 6/2017 | Liu et al. | |
| 2019/0118722 A1* | 4/2019 | Pompili | .................. B60R 21/02 |
| 2020/0091952 A1* | 3/2020 | Frenzel | ................ H04B 1/3888 |

* cited by examiner

SPRING-LOADED FALL PROTECTOR FOR PREVENTING A MOBILE TERMINAL DEVICE FROM FALLING

CROSS REFERENCE TO RELATED APPLICATIONS

This application is a continuation application of international patent application PCT/EP2019/055080, filed Feb. 28, 2019, designating the United States and claiming priority to German application 10 2018 105 199.9, filed Mar. 7, 2018, and the entire content of both applications is incorporated herein by reference.

TECHNICAL FIELD

The disclosure relates to a housing for an electronic device, in particular a protective cover for a mobile phone, and a spring-loaded fall protector for preventing a mobile terminal from falling.

BACKGROUND

Protection equipment for mobile phones is already known from the prior art. This type of protective equipment protects mobile phones from environmental circumstance such as dust and moisture and, in particular, from damage in the event of a fall. If the mobile phone falls to the ground without a protective device, the screen is often damaged. Other parts built into the mobile phone such as processor(s), memory, and camera(s) can also be damaged from the impact with the ground.

U.S. Pat. No. 9,715,257 B2 describes a screen protection integrated into a mobile phone. Sensors and microprocessors detect a fall of the mobile phone and activate a protective mechanism. The protective mechanism includes curved, elastic damping elements which can be extended via a mechanism integrated into the mobile phone when an impact is detected. The elastic damping elements slide in front of the screen to protect the mobile phone from damage when hitting the ground. The disadvantage of this solution is that the mechanics and the already curved damping elements take up a lot of installation space and only protect the screen from damage.

U.S. Pat. No. 7,059,182 B1 describes a protective cover for a mobile phone, which can detect a fall of the mobile phone via integrated sensors and a microprocessor. The microcontroller causes a releases unit to activate an impact protection mechanism which moves from a retracted position to an extended position. The impact protection mechanism includes several springs that are attached to the protective cover to protect each corner, the front, and the back of the mobile phone. The disadvantage of the solution is that the springs themselves are not dampened. Springs protect the mobile phone from a direct impact with the ground. However, the absorbed energy is returned to the mobile phone via the springs which causes the mobile phone to lift off again and hit the ground several times, which increases the stress on the mobile phone.

SUMMARY

It is an objective of the presented disclosure to provide an impact protection system for mobile phones that reduces stress to the mobile phones.

The objective is achieved by a housing for an electronic device as described herein.

The disclosure involves a housing, housing, or protective cover for an electronic device including at least one damping unit, which is movable between a retracted position and an extended position. The damping unit has a retracted state in which it is fixed within the protective cover, and an extended state, in which it is extended. In the extended state, the damping unit protects the mobile phone from damages caused by a collision with the ground. The damping unit includes a spring and a damper. The housing further includes at least one sensor and a release unit. The at least one sensor is configured to detect a fall of the electronic device. The release unit is configured to cause a change in the position of the at least one damping unit from the retracted position to the extended position upon detection of a fall. A fall occurs when the mobile phone moves in a way that one must assume that it is no longer under control of the owner and will soon hit the ground. The spring and damper are configured to change their shape when moving from the retracted position to the extended position.

The at least one sensor is, e.g., an acceleration sensor, which is provided to constantly monitor the acceleration of the mobile phone and to send the measured values to a microcontroller. The microcontroller evaluates the measured values of the acceleration sensor and triggers the release unit after exceeding a predetermined threshold limit. The release unit includes a latch or another mechanism suitable for fixating the damping unit in the retracted position. This causes the damping unit to move from the retracted position to the extended position.

Each damping unit typically includes two damping elements. The damping elements can be attached to a common clamping section. The clamping section may also be part of the damping unit and may be used to mount the damping unit on the protective cover. The damping unit can be locked in the retracted position with a locking mechanism, e.g., a nose or a hook, which is secured in openings arranged in the clamping section The release unit, which may be configured to pull the nose or the hook out of the opening in the clamping section, may be triggered by the microcontroller. The microcontroller prompts the release unit once it detects a fall above the threshold limit. A torsion spring, which can be mounted under mechanical pre-loading in the clamping section, moves the damping element from the retracted position to the extended position. Each damping element typically includes one spring and one damper. Both elements have at least two partially overlapping layers.

According to an aspect of the disclosure, the at least one spring is positively locked to the at least one damper. Positive-locking means a connection in which components are connected to one another solely based on their geometric shape and are not dependent on a force-transmitting connection such as an adhesive. According to another aspect of the disclosure, the at least one spring and the at least one damper are movable relative to one another under friction. The movement of the spring and the damper causes friction which, in addition to the damping effect of the damper, compensates the kinetic energy generated by the fall. The kinetic energy is absorbed by the at least one damping unit from the damping element and converts it into frictional heat, thereby further reducing the probability of the mobile phone lifting off again. An additional advantage is that the spring and the damper perform mostly the same movement from the retracted position to the extended position. The spring moves the damper, caused by the energy stored in the spring, and can bring the damper into almost the same shape as the spring.

Generally speaking, there are other possible types of connections between the spring and the damper, in particular a combination of positive locking and adhesive bonding or even pure adhesive bonding.

According to another aspect of the disclosure, at least one spring is configured as a leaf spring. Through generations, mobile phones have become increasingly slimmer. In addition to the functional requirements described above, the protective covers also have to meet aesthetic requirements and are expected to distort or change the external design and shaping of the mobile phone as little as possible. This implies that a protective cover for a slim mobile phone is also expected to have a very minimal structural height. In order to make the damping element as flat as possible in the retracted position, it is beneficial to use a leaf spring as a spring in the damping element.

According to another aspect of the disclosure, at least one damper is made of plastic, in particular of thermoplastic polyurethane. The damper must be flexible, reusable, and provide high damping. These features are particularly achievable with thermoplastic polyurethane. Flexibility can be adjusted by using this class of thermoplastic. This allows it to respond to the different needs of different mobile phone models. Thermoplastic polyurethane is hereinafter also referred to as TPU. The shape of the damper can be close to the shape of the spring when it is bent up in its relaxed state. The damper, which is positively locked to the spring, can be pushed as a damping element into a flat position. This is accomplished when the damper is pushed into an opening in the protective cover, while moving from the extended position to the retracted position. According to another aspect of the disclosure, the at least one damper has at least one notch arranged perpendicular to its longitudinal axis. The longitudinal axis of the damper and the damping element is the axis perpendicular to the bending direction of the spring and the damping element. The notch prevents the plastic from flowing, which can occur when retaining it in the retracted position for a long time. The result may be that, when the damping element is moved back to the extended position, it can no longer be completely returned to its original shape. The notches act like joints and ease the shaping of the damper from the retracted position to the extended position of the damping elements and vice versa, without significantly reducing the damping effect of the damper.

If the mobile phone falls to the ground, the damping elements in the extended position are deformed as soon as the mobile phone hits the ground. Damping of the kinetic energy which is released during the fall, is achieved via dissipation of energy, which is needed to transform the volume of the damper into heat.

The damping elements are advantageously configured to be able to absorb at least 1.5 joules of energy. This is sufficient to absorb a fall of the mobile phone regardless of the orientation in the room to an extent of no damage. One part of the energy is converted into heat by the damper. Another part of the energy initially remains in the spring as mechanical deformation energy and is released back into the mobile phone.

According to a further aspect of the disclosure, at least one of the damping elements tapers towards its free end and/or the longitudinal axes of the damping element and the protective cover are twisted relative to one another by an angle greater than 0° in the retracted position. As previously described, the required installation space for the protective cover is very large. At the same time, the damping effect of the damping units is defined by the mass of the mobile phone and the drop height from which the mobile phone can fall without being damaged. The energy absorbed by the damping elements depends on the thickness of the springs and dampers, along with their width, stiffness, and length. The spring can be configured such that it is always deformed in the elastic range. The width of the damping units is the deciding factor for the tension in the spring, whereas the tensions in the material of the spring and the damper increase towards the clamping section and decrease towards the free end. Therefore, it is possible to reduce the width of the damping elements towards the free end without moving into the plastic portion of the spring, and to avoid having to accept intolerable losses in the energy absorption of the damping elements. The tapered damping elements, which can overlap due to the tapered ends, make it possible to use damping elements that are longer than half of the length of the mobile phone without requiring additional installation space. In the retracted position, the damping elements finish off smoothly with the at least one edge of the protective cover, in order to make optimum use of the given installation space. In order to arrange two damping elements positioned at one long side of the protective cover, in a way that takes up as little space as possible, it is necessary to rotate the longitudinal axis of the damping element, i.e., the axis perpendicular to the bending direction of the spring, which corresponds to the longitudinal axis of the display and which is relative to the longitudinal axis of the mobile phone. Because of this rotation, one side of the tapered damping element is located parallel to the outer edge of the protective cover. The second damping element is arranged such that the twisted side opposite to the longitudinal axis of the mobile phone is parallel to the first twisted damping element which is opposite to the longitudinal axis of the mobile phone. The second side is parallel to the longitudinal axis of the mobile phone.

The damping elements can be moved from the retracted position to the extended position by a torsion spring or a coil spring mounted at one end on the clamping portion and with the other end on the protective cover. This takes place after the release unit has released the lock. The release unit may include an actuator which may include a shape memory alloy (SMA). According to an aspect of the disclosure, the actuator includes a wire attached to two actuator bearings. The wire has a bend which determines the displacement and the force of the actuator. The bend angle can be selected between 0 and 180° depending on the exemplary embodiment. Shape memory alloys or memory metals are specific metals that can exist in two different crystal structures. The term shape memory means the unusual characteristic to remember a particular shape. After a severe deformation, the SMA is able to deform back into a previously embossed shape. Unlike an SMA, most metals always have the same crystal structure up to their melting point. An SMA changes its structure depending on the temperature. There is a high temperature phase (austenite) and a low temperature phase (martensite). These two phases can merge into each other due to temperature changes. Within certain stress limits, the associated change in shape is completely reversible. This effect is particularly pronounced with metallic alloys such as nickel-titanium (NiTi and Nitinol).

According to an aspect of the disclosure, the so-called one-way effect is used. This is based on pseudoplastic deformation in the martensitic state. By applying a mechanical stress, the crystal lattice can easily be reoriented in the martensitic state and a change of the shape is realized, which is permanent in the cold state. However, if the temperature is increased, the original crystal orientation of the austenite is being restored. Thus the original shape of the shape memory element is being restored. If the material is cooled down again, no further thermally induced deformation occurs; however, the material can be mechanically reshaped again.

According to an aspect of disclosure, the housing includes four damping units. The damping units are extended until they are positioned in every corner of the mobile phone in the bisector of an angle, which lies between two sides enclosing a corner. In this way, each of the damping elements bends in the direction of the screen, hereinafter referred to as the front side of the mobile telephone, and in the direction of the side of the mobile phone facing away from the display, hereinafter referred to as the rear side of the mobile telephone. This allows for the mobile phone to be protected from damage via impact independent from the position of the mobile phone in space. This position corresponds to the extended position of the damping units. Depending on the configuration of the locking units and their connection to the actuator, the four damping units can be unlocked with one actuator each, with two actuators, or with just one actuator for all four damping units.

According to another aspect of the disclosure, the at least one damping element is spirally bent in the extended position. In a particularly advantageous configuration, the opening angle of the spirally curved damping element is between 120° and 180°, more particularly at 150°. In addition to spiral bending, other bending shapes such as circular, triangular, or oval are also possible.

Tests have shown that the energy absorption, required for effective protection of the damping elements of at least 1.5 joules was best achieved by a spirally rolled damping element with an opening angle of 150°. The opening angle of the damping element is the angle that the tangent at the free end of the damping element passes from the retracted position to the extended position.

BRIEF DESCRIPTION OF THE DRAWINGS

The disclosure will now be described with reference to the drawings wherein.

DESCRIPTION OF EXEMPLARY EMBODIMENTS

Figure 1:
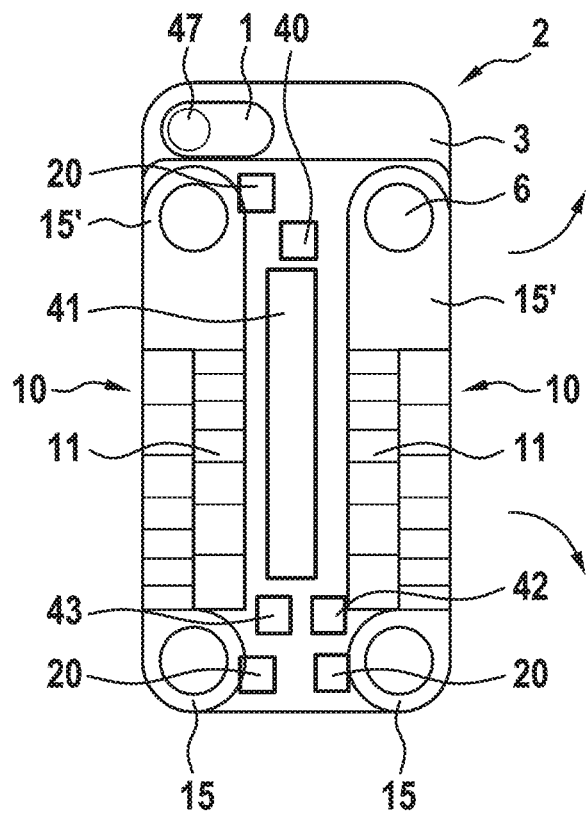
FIG. 1 shows a top view of a protective cover according to a first exemplary embodiment of the disclosure.

FIG. 1 shows a housing for an electronic device according to a first exemplary embodiment of the disclosure. In the exemplary embodiment shown in FIG. 1, the housing is designed as a protective cover 2 for a mobile phone 1 with a camera 47. The protective cover 2 includes a base frame 3 and a cover, which is not shown separately in FIG. 1 for better clarity. The cover fixes the parts of the protective cover 2 which are arranged on the base frame 3 and/or protects them from external influences such as dust and moisture. The parts can either be mounted and fixed to the cover first or the cover can be installed on the base frame 3, after the parts have been mounted to it. Further, the protective cover 2 for the mobile phone 1 includes damping units 10, which each include a damping element 11 and a clamping section 15, release units 20, an acceleration sensor 42, a touch sensor 41, an energy storage 43, and a microcontroller 40. In the base frame 3 and/or in the cover, mountings are provided for these components in order to fix them in the mounted state on and/or between the base frame 3 and the cover. The protective cover 2 can be made of any material such as PA6, PA66, PA12, PC, PET, PBT, TPU, and TPE. The acceleration sensor 42 is configured to continuously measure the acceleration of the mobile phone 1 and to continuously send the measured values to the microcontroller 40. The touch sensor 41 in configured to determine if the mobile phone 1 is held, for example, in a hand or stored in a pocket, such as a pants pocket or handbag. It also sends this information to the microcontroller 40, especially if a free fall has been detected. The microcontroller 40 determines whether the mobile phone 1 is falling based on the received data and predefined threshold limits. In the event of a detected fall, the microcontroller 40 sends a signal to the release units 20, which then trigger the damping units 10 to dampen the upcoming impact of the mobile phone 1 on a surface, such as the floor, and thus prevent damage to the mobile phone 1. In the shown exemplary embodiment of the disclosure, four damping units 10 are arranged in the vicinity of the four corners of mobile phone 1. In the extended state, the four damping units 10 stick out over a plane of the display, hereinafter referred to as the front side of mobile phone 1, the plane side opposite of the display, hereinafter referred to as the rear face of mobile phone 1, and the corners of the mobile phone 1, which are located in an extension of the bisector of the angle between the side edges of mobile phone 1 enclosing a corner. In this position the damping units 10 can absorb the impact regardless of the orientation of mobile phone 1 during the impact.

This position of the damping element 11 in the extended position cannot always be achieved with identical damping units 10 for all four corners due to special requirements of the installation space. In order to avoid covering the camera 47 of the mobile phone 1, which is positioned in the upper left corner, with the clamping section 15' or another structural component while in the retracted position, the damping units 10 on the upper half of the protective cover 2 shown, have an extended clamping section 15'.

The damping units 10 are mounted in the protective cover 2 in a flexible way and have a retracted position and an extended position. The damping units 10 can be locked in the retracted position. The clamping section 15 is mounted on a receptacle clamping section 6 and together they form a pivot point for the damping unit 10. In the retracted state, the damping units 10 are located between the side of the protective cover 2 facing away from the mobile phone 1 and the cover in a recess formed by the protective cover 2. They are compressed by the cover on one side and the base frame on the other side and are thus forcibly held in their compressed, flat form.

Figure 2A:
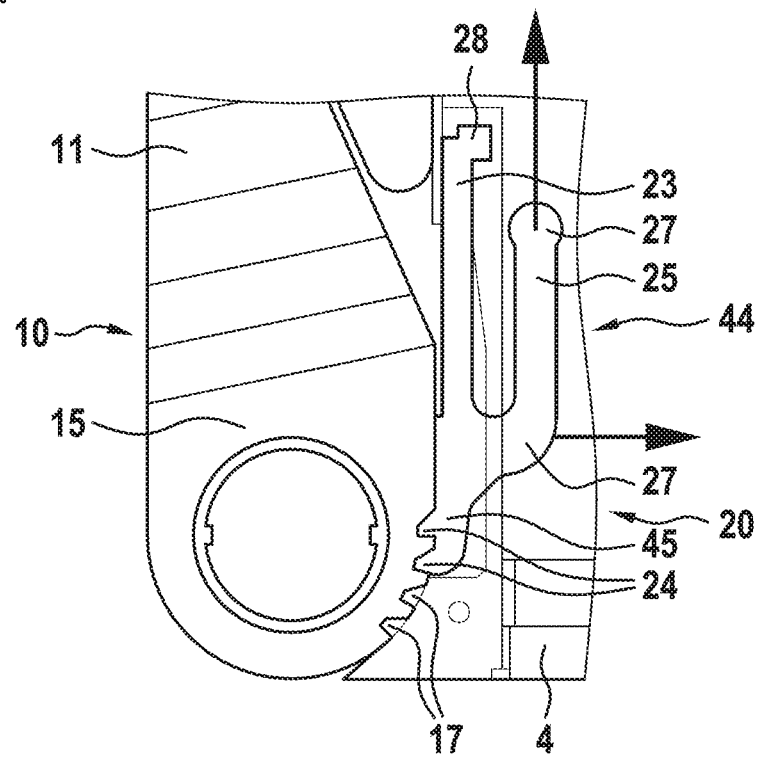
FIG. 2A shows a top view of a detail of the protective cover in the retracted state according to an exemplary embodiment of the disclosure.

FIG. 2A shows a detailed view a damping unit 10 and parts of the release unit. In this exemplary embodiment, the components of the protective cover 2 are mounted on the cover 4 and the base frame is not shown for better clarity. The damping unit 10 includes a damping element 11 with a damper not shown in the figure, a spring also not shown in the figure, and a clamping section 15. This allows the damping unit 10 to be fixed between the base frame of the protective cover 2 and the cover 4. The clamping section 15 is rounded on one side. The damping element 11 connects to the clamping section 15 on a side opposite to the rounded side. This allows for damping element 11 to be connected to the clamping section 15 over the entire width or alternatively only over part of the width. The clamping section 15 has a circular recess which, in the exemplary embodiment shown, also serves as a pivot bearing for the damping unit 10. This allows the damping unit 10 to swing radially out of the protective cover 2 from the retracted position into the extended position. Further, at least one recess 17 is provided at the clamping section 15, into which a nose 24 of a locking unit 44 can engage, holding the damping unit 10 in its position in the retracted state. The locking unit 44 in this exemplary embodiment includes a bending beam 23 and, a beam bearing 28 which can be integrated in the cover 4 and an actuator not shown in the figure, and part of the release unit 20. The bending beam 23 can be made of plastic or any other suitable material. The bending beam 23 is pretensioned to ensures a secure locking of the damping unit 10 in the protective cover 2. The bending beam 23 is supported on one end by the beam support 28 and shows a head piece 45 on the other. The head piece 45 is designed to be able to engage in the recess 17 by the force of the pretensioned bending beam 23, so that the locking unit 44 locks the damping unit 10 in the retracted position. In the exemplary embodiment shown in FIG. 2A, there are several equidistant recesses 17 with identical shapes in a row. When the damping units 10 are pushed back from the extended position to the retracted position, these equidistant recesses 17 can engage before the damping units 10 are fully retracted, thus simplifying the operation of the retraction process. The head piece 45 shows the two noses 24, which have the same distance as the recesses 17 and, when fully retracted, each engage in a recess 17 to ensure secure locking. The recesses 17 and the noses 24 are shaped so that one side of the recesses 17 and the corresponding side of each nose 24 are perpendicular to the tangent of the round recess of the clamping section 15. Therefore, the noses 24 and the recesses 17 form a fixed stop caused by the two vertical sides, against which the damping unit 10 can remain safe in the retracted position. The opposite sides of the recesses 17 and the noses 24 are configured such that the head piece 45 is lifted onto an incline from the recesses 17, when the damping unit 10 moves from the extended to the retracted position. After a fall, the damping unit 10 can be pushed back into the protective cover 2 by applying a force until the noses 24 snap in the recesses 17 and the damping unit 10 is thereby locked. If desired, this process can be repeated, so that the protective mechanism can be activated repeatedly after the damping units 10 have been returned to the protective cover 2. The head piece 45 is connected to the actuator on the side of the bending beam 23 which is facing away from the damping unit 10. In the exemplary embodiment shown in FIG. 2A, the bending beam 23 is connected to a lever 25 which is configured to deflect the force of the actuator by 90°. The arrows shown in FIG. 2A show the direction in which the actuator must pull on the bending beam 23, with and without the use of the lever 25, in order to pull the bending beam 23 back from the clamping section, 15 against the force of its pretension and thus releasing the locking unit 44.

As indicated by the arrows, the actuator can engage either in the direction of the pretension directly on the bending beam 23 or parallel to the bending beam 23 on the lever 25, whereby the force is deflected by 90° by the lever 25. If the locking unit 44 is released, the damping unit 10 is moved from the retracted position to the extended position by a torsion spring. The torsion spring is therefore mounted in the retracted position with pretension.

Figure 2B:
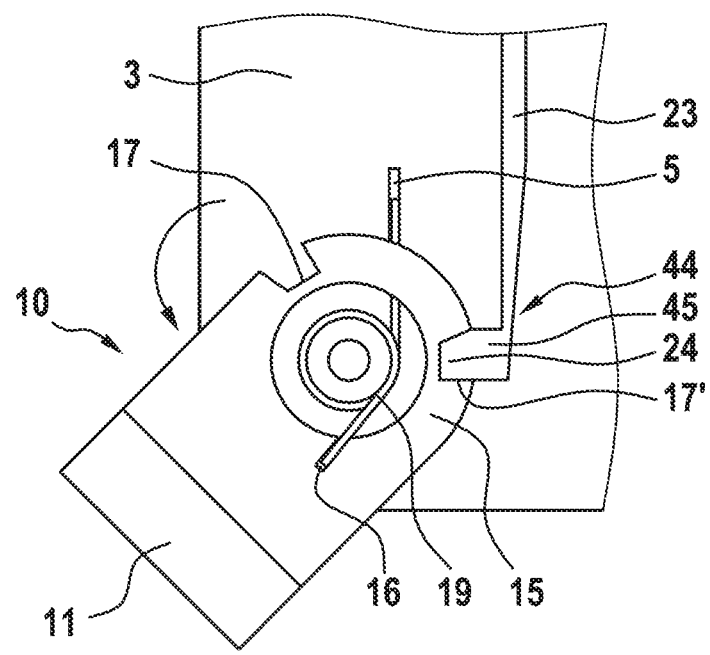
FIG. 2B shows a top view of a detail of the protective cover in the extended state according to an exemplary embodiment of the disclosure.

FIG. 2B shows another exemplary embodiment of the disclosure. In contrast to the exemplary embodiment shown in FIG. 2A, the clamping sections 15 and the bending beam 23 are configured differently. Here the clamping section 15 has only one recess 17 for fixing the damping units 10 in the retracted position, whereby the basic configuration of the recess 17 is identical with a vertical side and an incline as described above. In addition, a second 17' recess is arranged in the clamping section 15, which enables locking in the extended state of the damping unit 10 and at the same time serves as a stop for the damping unit 10. The only nose 24 of the bending beam 23 is configured to match the recesses 17 and 17'. In addition, a further recess 16 is integrated in the clamping section 15, which is configured to accommodate an end piece of a torsion spring 19, which is also identical to the first exemplary embodiment shown in FIG. 2A. The torsion spring 19 is fixated with one end on the base frame 3 or the cover 4 in a receptacle 5 and with the other end in the recess 16 in the clamping section 15. The torsion spring 19 is configured to move the damping unit 10 from the retracted position to the extended position after the microcontroller 40 has detected a fall and the locking unit 44 has been released by the release unit 20. The torsion spring 19 is mechanically preloaded when the damping unit 10 is retracted. This means, it has stored deformation energy which is released when the locking unit 44 is released and which is used to swing the damping unit 10 radially around the pivot bearing 15 out of the recess in the protective cover 2.

The clamping section 15 and the damper can be made in one piece, i.e., from the same material, as shown in FIG. 1. The requirements for the material for the part of the clamping section 15 in which the recesses 17 or 17' are arranged and for the material of the damper, differ in firmness and rigidity. Therefore, the clamping section 15 would typically be configured in two parts. A first part is the damper and a mounting for the clamping section 15 or a part of the clamping section 15 made in one piece from a softer material advantageous to the damping characteristics of the damper. The second part, the clamping section 15 or a part of the clamping section in which the recesses 17 or 17' are arranged, is made of a stiffer and/or harder material for better durability and stability, and is connected to the first part of the damper material. The connection of the two parts can be done by a positive connection, such as with a tongue and groove, or by a forced connection, such as an adhesive process, like gluing or welding, or a combination of both. FIG. 2B shows the damping unit 10 in the extended position. The head piece 45 of the bending beam 23 is locked in the second recess 17' and holds the damping unit 10 in an ideal position to protect the mobile phone 1. It is therefore at an angle between a longitudinal axis of the damping element 11 and the two side edges of the mobile phone 1 between 110° and 160°. An angle of 135°, i.e., the angle bisector of the angle enclosed by the side edges, forms the optimal protection. The torsion spring 19 is partially released in this position. The remaining force is sufficient enough in the event of an impact to press the damping unit 10 firmly against the stop in the recess 17' which prevents the damping unit 10 from accidentally collapsing, which would then result in a reduction of the damping effect of the damping unit 10.

Figure 2C:
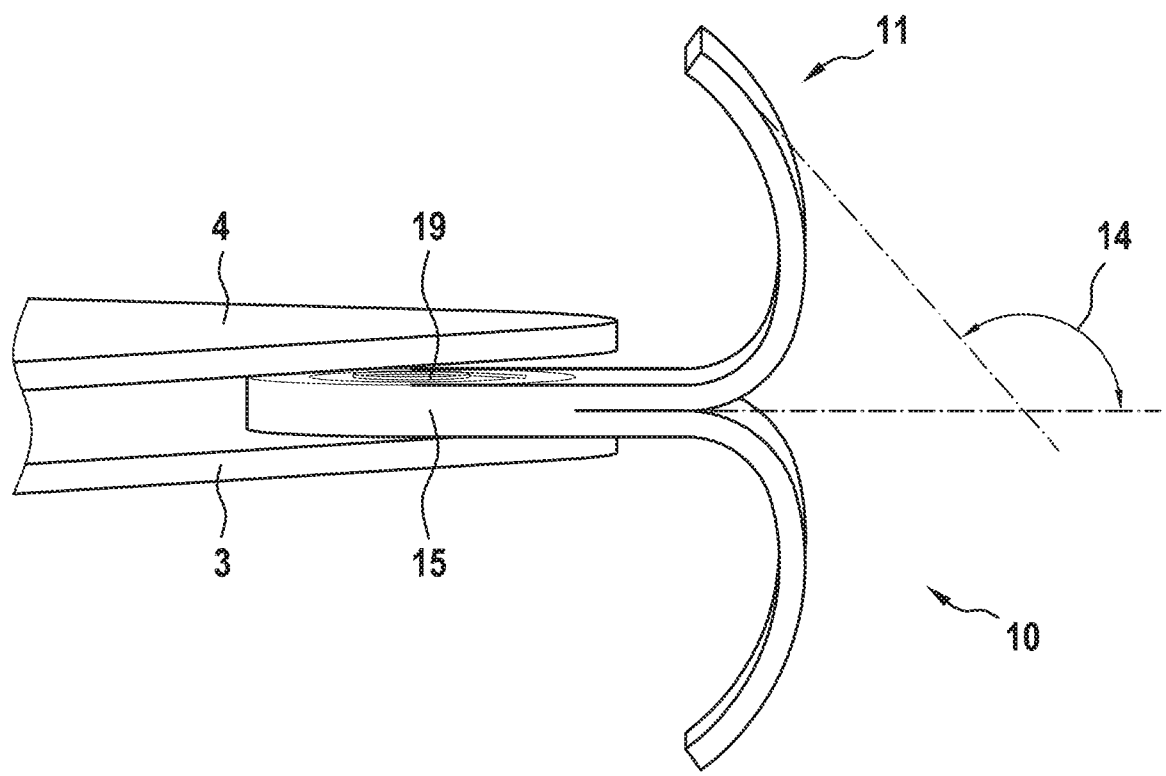
FIG. 2C shows a side view of the protective cover in the extended state according to an exemplary embodiment of the disclosure.

FIG. 2C shows a side view of the damping unit 10 shown in FIG. 2B in the extended position. While the angle between the longitudinal axis of the damping element 11 and the side edges enclosing a corner should be 135° to achieve the best damping results, the damping element 11 is spirally bent even in the open position. A spiral bend is defined as an arch-shaped bend of the damping element 11 out of the plane of the clamping section 15. Starting from the clamping section 15 in the direction of the end of the damping element 11 which is turned away from the clamping section 15, the angle, which the portion of the damping element 11 encloses with the plane of the clamping section 15, can increase from 0° to approximately 100° to 180°. An angle of approximately 150° is particularly typical for the last section on the side of the damping element 11 which is facing away from the clamping section. This angle is referred to hereinafter as the opening angle 14 of the damping element 11. The openings of the two spirally curved damping elements 11 are facing in opposite directions, whereby the end of one damping element 11 faces towards the front of the mobile phone 1 and the end of the other damping element 11 faces towards the rear of the mobile phone 1. This way, the mobile phone 1 is best protected against damage in the event of a fall to a flat surface, regardless of its orientation in space.

Figure 3A:
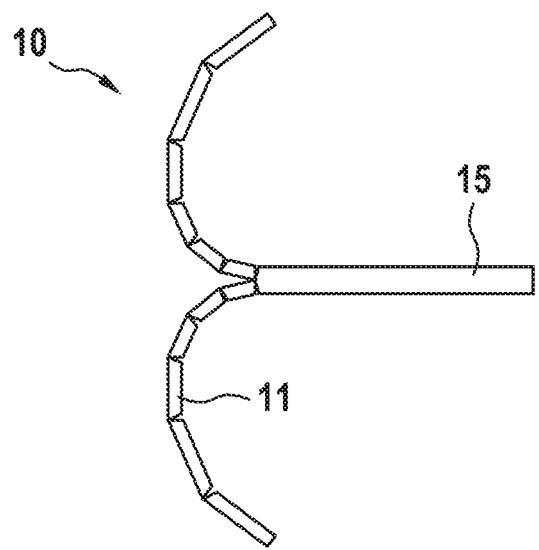
FIG. 3A shows a side view of a damping unit according to an exemplary embodiment of the disclosure.
Figure 3B:
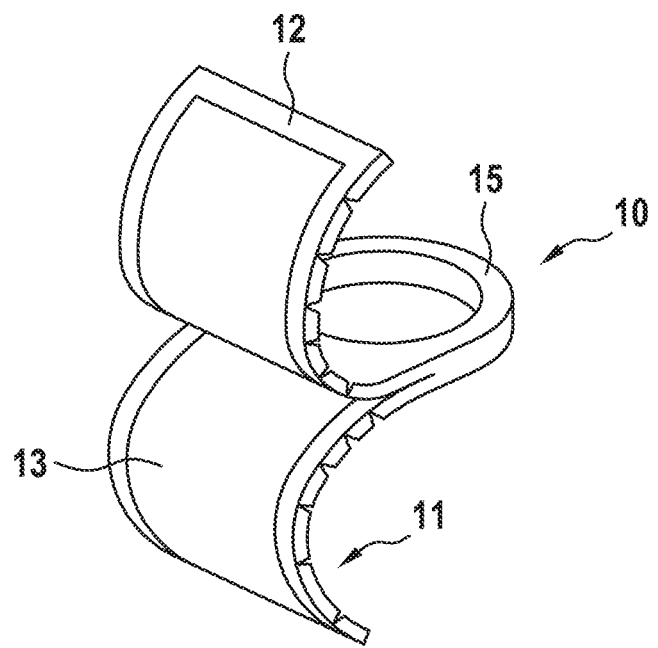
FIG. 3B shows a perspective view of a damping unit according to an exemplary embodiment of the disclosure.
Figure 3C:
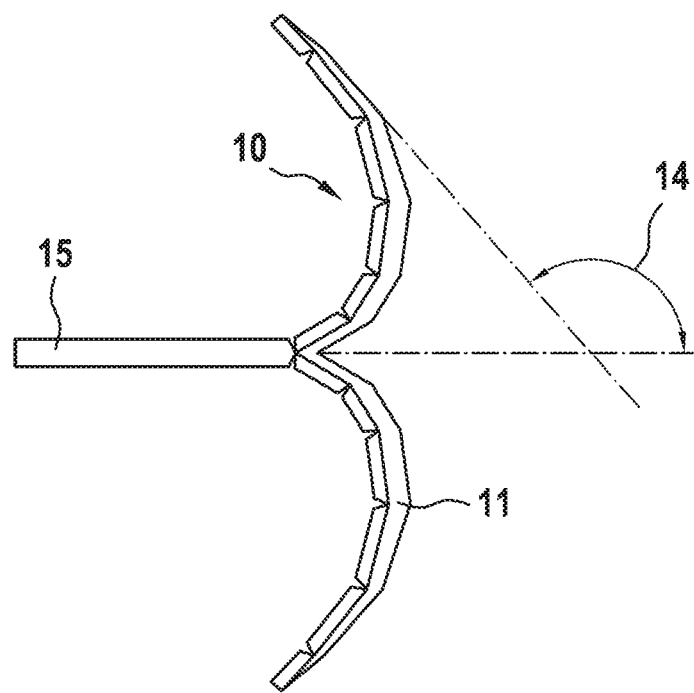
FIG. 3C shows a side view of a damping unit according to another exemplary embodiment of the disclosure.

FIGS. 3A and 3B show exemplary embodiments of a damping unit 10 including a clamping portion 15 and two damping elements 11 each again including of a damper 12 and a spring 13. FIG. 3A shows a side view of the damping unit 10 and FIG. 3A shows a perspective view. The spring 13 is bent outwards when extended. The damper 12 is configured to accommodate the spring 13 and encloses the spring 13 at least partially. The spring 13 can be inserted into the damper 12 just like in a pocket or cover and/or can be connected to the pocket or cover with bending straps. Therefore, the spring 13 and the damper 12 are connected to each other by positive locking and the damper performs the same deformations as bending, compressing, buckling or bending the spring 13. The spring 13 and the damper 12 can still move against each other in the event of a deformation of the damping element 11, which increases the damping due to friction between the spring 13 and the damper 12. The damping element 11 is brought from the flat shape of the retracted position into a curved shape, corresponding to the shape of the spring 13 in the extended position, by the deformation energy stored in the spring 13. In the case of a fall, for example from a height of 2 meters, the spring 13 and the damper 12 absorb the energy of the fall. The energy absorption is at least 1.5 joules for a damping element 11, regardless of the impact angle, so that the fall of the mobile phone 1 can be stopped within the spring travel of the damping element 11. The energy absorbed by the spring 13 is returned to the protective cover 2 by the spring 13 with practically no energy loss. The energy absorbed by the damper 12 flows for the most part into the deformation of the volume of the damper 12 and is dissipated there in the form of heat. The more energy is absorbed by the damper 12, the less likely it is that, after a first impact, the energy returned from the spring 13 will cause the mobile phone 1 to lift off the ground again and to hit the ground or a different obstacle again. A second impact must be avoided due to an increased risk of damage to the mobile phone 1. Therefore, the spring 13 is configured to slow down the impact inside the spring travel as much as possible in order to keep the stress on the mobile phone 1 to a minimum. The damper 12 in configured to convert as much kinetic energy as possible into heat by deforming the volume and thus dissipating the original kinetic energy into the system as thoroughly possible, until the mobile phone 1 remains on the ground. By combining the spring 13 with the damper 12 in the way described above, it is possible to achieve the maximum possible protection and damping effect within a very small installation space without restricting reusability and easy usage. By arranging the dampers 12 on the inside of the spirally bent spring 13 in the extended position, the damper 12 is compressed when the spring 13 is deformed, resulting in a reduction and/or transformation of the volume of the damper, whereby kinetic energy is converted into heat. Compressing the plastic is more advantageous for the lifespan of the plastic than stretching it. This would be the case in a reverse arrangement, i.e., with the damper 12 on the outside of the spirally bent spring 13. In addition, the softer damper material is better suited to support folding the damping elements 11 from the extended to the retracted position, by friction on the cover 4 or the base frame 3. The force required to fold in the damping unit 10, when moving it into the protective cover 2, must not be too high and is, for example, smaller than 150N in the exemplary embodiment shown. This ensures easy handling when folding in the damping elements 11 after a fall.

In particular, the dampers 12 of a damping element 11 can be configured to different thicknesses—the damper facing the screen of the mobile phone can be thicker than the damper facing the rear. Thicknesses in the range of approximately 1.6 mm are advantageous for the thicker damper, and approximately 1.2 mm for the thinner one.

The spring 13 can be configured such that the deformation from the extended form to the deformed retracted position is within the elastic range. Furthermore, the spring 13 should have a high alternate bending strength in order to be able to move the reusable damping unit 10 repeatedly from the retracted to the extended position and back without the concern to damage the spring 13. The area of clamping section 15 is particularly critical, as this is where the highest bending stresses occur in the event of a fall. Furthermore, the length and width of the spring 13 affect the stresses, stiffness, and travel of the spring 13. These requirements are achieved in a favorable way by the combination of a spring made of steel and a damper made of thermoplastic polyurethane, hereinafter referred to as TPU. Using PA (PA6, PA66, and PA12), PET, and PBT is also conceivable.

The shape of the damping element shown in FIGS. 3A and 3B is rectangular and represents an initial possible shape.

Figure 3D:
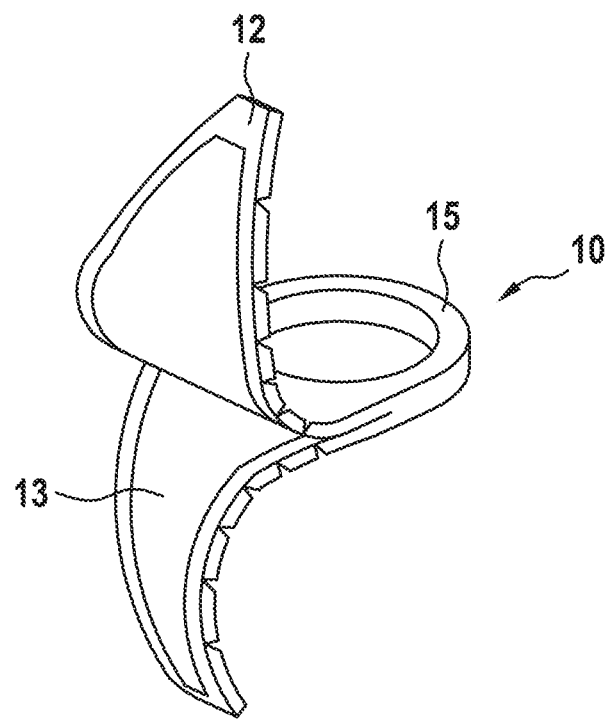
FIG. 3D shows a perspective view of a damping unit according to an exemplary embodiment of the disclosure.

FIGS. 3A and 3D also show a side view and a perspective view of a form, but the damping element 11 tapers towards the free end. Trials have shown that the absorbed energy and the spring travel are only minimally reduced with a significantly smaller installation space requirement. Due to the tapered shape, two damping elements 11 can advantageously be arranged at least partially next to each other and thus interlock with each other.

Figure 3E:
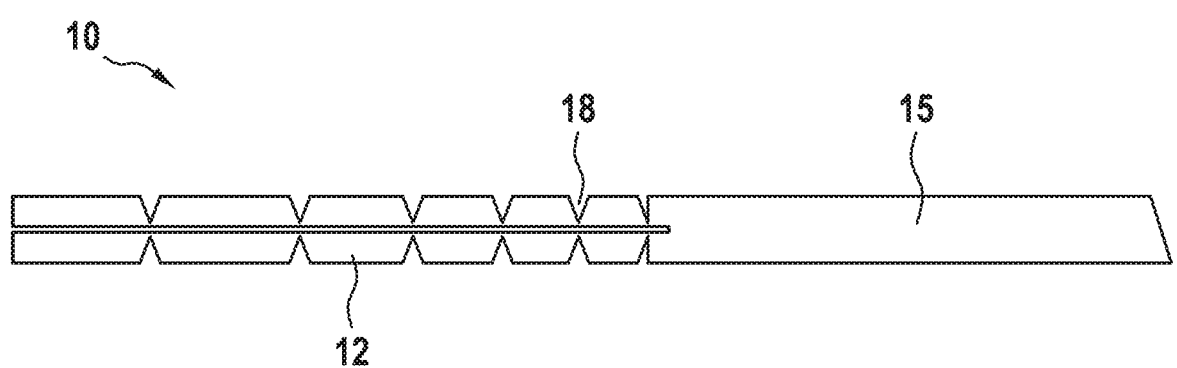
FIG. 3E shows a side view of a detail of the damping unit according to an exemplary embodiment of the disclosure.

FIG. 3E shows a side view of the damping unit 10 shown in FIGS. 3A and 3B in the retracted position. The inner spring plates are covered by the plastic surrounding the springs 13. The damper 12 has notches 18 on the outside, i.e., the side which is outside in the folded position. The notches 18 are arranged at different distances, whereby the distances start to increase from the clamping section 15. The notches 18 function like joints 18, which reduce the required force to bend the damper from the extended to the retracted position and prevent the plastic to flow during a prolonged state in the retracted position. The flow of the plastic would prevent the damping element 11 to reach the full opening angle 14 after being released in the extended position. The spring 13, which is always deformed within its elastic range, does not show such creep deformation and can therefore, be designed conventionally. The distances of the joints 18, which are increasing towards the end of the damper 12 opposite the clamping section 15, essentially affect the shape of the extended damping element 11. In the exemplary embodiment shown, the increasing distance of the joints 18 results in a spiral bend of the extended damping element 11. An equidistant distance of the joints 18, for example, would lead to an arched circular shape of the extended damping element 11.

Figure 4A:
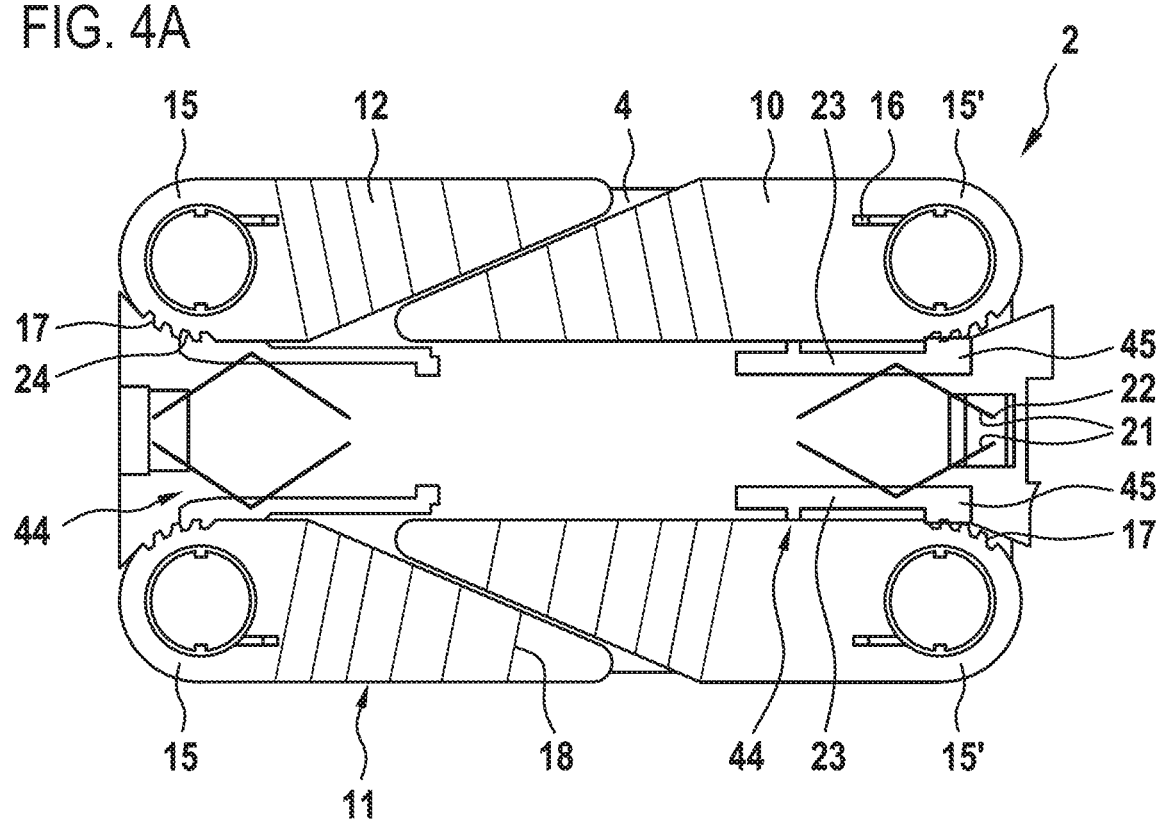
FIG. 4A shows a top view of a protective cover according to a second exemplary embodiment of the disclosure.

FIG. 4A shows a second exemplary embodiment of the disclosure, in which the damping units 10 are provided in such a manner that the damping elements 11 taper in the direction of their distal end, i.e., the end facing away from the clamping section 15. The tapered damping elements 11 are arranged at an angle greater than 0° to the longitudinal axis of the mobile phone 1 so that one side of the damping element 11 is parallel to one side edge of the protective cover 2 and, in a typical exemplary embodiment finish even with the protective cover 2. The notches 18 in the dampers 12 are arranged perpendicular to the axis of symmetry of the damping element 11, along which the spring 13 spirally rolls up in the extended position. In the extended position, the axis of symmetry of the damping elements 11 is positioned on the bisector of the angle between the side edges of the mobile phone 1 enclosing a corner, in order to achieve the best possible protection and damping effect. Due to space requirements, this position of the damper 12 cannot always be achieved with identical damping units 10 for all four corners. The damping units 10 on the right side of the shown protective cover 2 have an extended clamping section 15'. This prevents to cover, for example, a camera positioned in one of the upper corners in some mobile phone models (see FIG. 1). Therefore, the damping units 10 can be of different lengths. The angle that the damping units 10 sweep between the retracted and the extended position can therefore vary between 90° and 180° for the different damping units. Typical values for the damping units (with extended clamping section) shown in FIG. 1 above are within the range between 150° and 170°, in particular within the range between 157° and 161°, and for the damping units shown in FIG. 1 below within the range between 120° and 140°, in particular within the range between 127° and 131°.

All four damping units 10 are directly connected via a bending beam 23 to an actuator 21, which, in the exemplary embodiment shown, is configured as a wire made of a SMA, hereinafter referred to as SMA wire 21. Piezo-electric, electromagnetic or any other type of suitable actuator can also be used. SMA wires, also known as memory metals, are special metals which can exist in two different crystal structures. The term shape memory means the unusual quality to remember a shape. After a severe deformation, the shape memory alloy is able to deform back into a previously embossed shape. Unlike an SMA, most metals always have the same crystal structure up to their melting point. This alloy changes its structure according to the temperature.

There is a high temperature phase (austenite) and a low temperature phase (martensite). These two phases can merge into each other due to temperature changes. Within certain limits, the associated change in shape is completely reversible. This effect is particularly pronounced with metallic alloys such as nickel-titanium (NiTi, Nitinol).

In the exemplary embodiment shown, the so-called one-way effect is used. This is based on pseudoplastic deformation in the martensitic state. By applying a mechanical stress, the crystal lattice can easily be reoriented in the martensitic state and a change of shape is created, which is permanent in the cold state. However, if the temperature is increased, the original crystal orientation of the austenite is restored during the temperature increase. Thus the original shape of the shape memory element is restored. If the material is cooled down again, there is no further change in the shape. Voltage can be applied to the SMA wire 21 at the actuator bearings 22. When electricity flows through the SMA wire 21, it heats up and thus the effect described above occurs. In its original form, the SMA wire 21 is shaped to move the bending beam 23 so far, that the damping unit 10 is completely unlocked.

The bending beam 23 on the other hand is configured to apply sufficient force to deform the SMA wire 21 in the pseudo plastic area via mechanical force whereby the wire is stretched. High elongation causes the head piece 45 to be pressed into the recess 17, because of the force applied by the bending beam 23, and the damping units 10 are locked in the retracted position. The bending beam 23 shown in FIG. 4A is thus configured to apply the force for pseudo-plastic deformation of the SMA wire 21 as well as the force for pressing the head piece 45 of the bending beam 23 against the recess 17 and into the locking unit 44. On the other hand, it only generates as much force as the SMA wire 21 can return to its original form when heating back up to the high temperature phase. The ends of the SMA wire 21 are fixated between two actuator bearings 22. In the exemplary embodiment shown, the SMA wire 21 is bent in its original form in the middle with a bend angle of approximately 130°, so that it spans an isosceles triangle with the connecting line between the two actuator bearings 22. In the exemplary embodiment shown, each interlocking unit 44 is released by one actuator 21, when the microcontroller 40 detects a fall and the release unit 20 applies a voltage to the SMA wire 21.

Figure 4B:
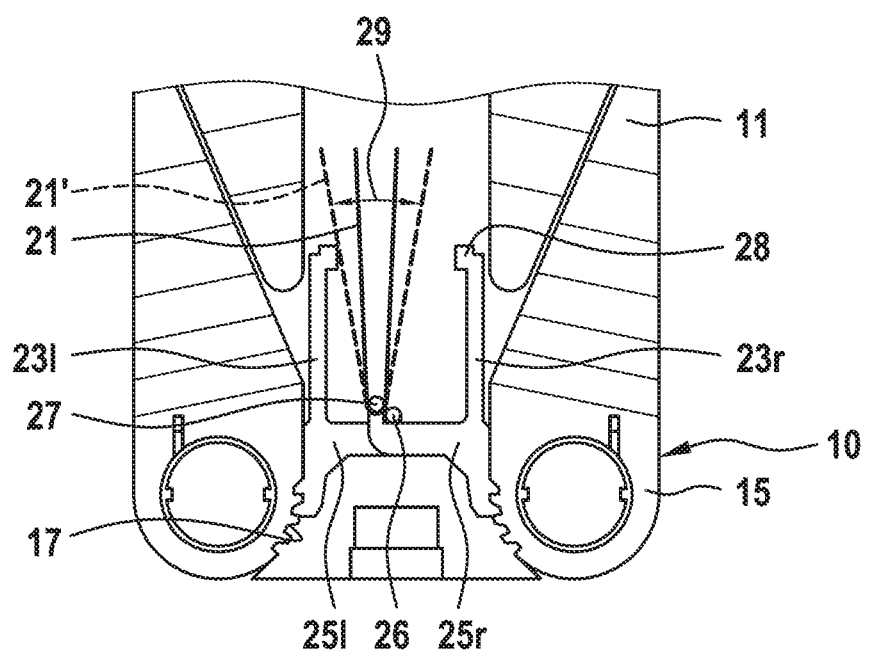
FIG. 4B shows a top view a protective cover in a retracted state according to an exemplary embodiment of the disclosure.

FIG. 4B shows an additional exemplary embodiment of the release unit, where two bending beams 23r and 23l are released by only one actuator, which is again configured as a SMA wire 21. The lever 25l, which is connected to the left bending beam 23l in FIG. 4B, is equipped with a towing arm 26 at its end. The lever 25r, which is connected to the right bending beam 23r, reaches so far over the lever 25l that it moves the lever 25l over the towing arm 26, when actuated by the actuator 21 connected to it at the attachment point 27. This releases both damping elements 11. In FIG. 4B, in addition to the SMA wire 21, a dashed SMA wire 21' is shown. Its kink angle differs from the one of wire 21. The bending angle 29 has an influence on the force exerted by the SMA wire 21 or 21' and on the covered distance between the original and the mechanically deformed shape of the wire 21 or 21' and in the example shown is within the range of 10° and 20°. A further criterion in the configuration of the bend, i.e., the bending angle 29, is the reaction speed of the SMA wire 21, whereas the SMA wire 21 plays a less important role.

Figure 4C:
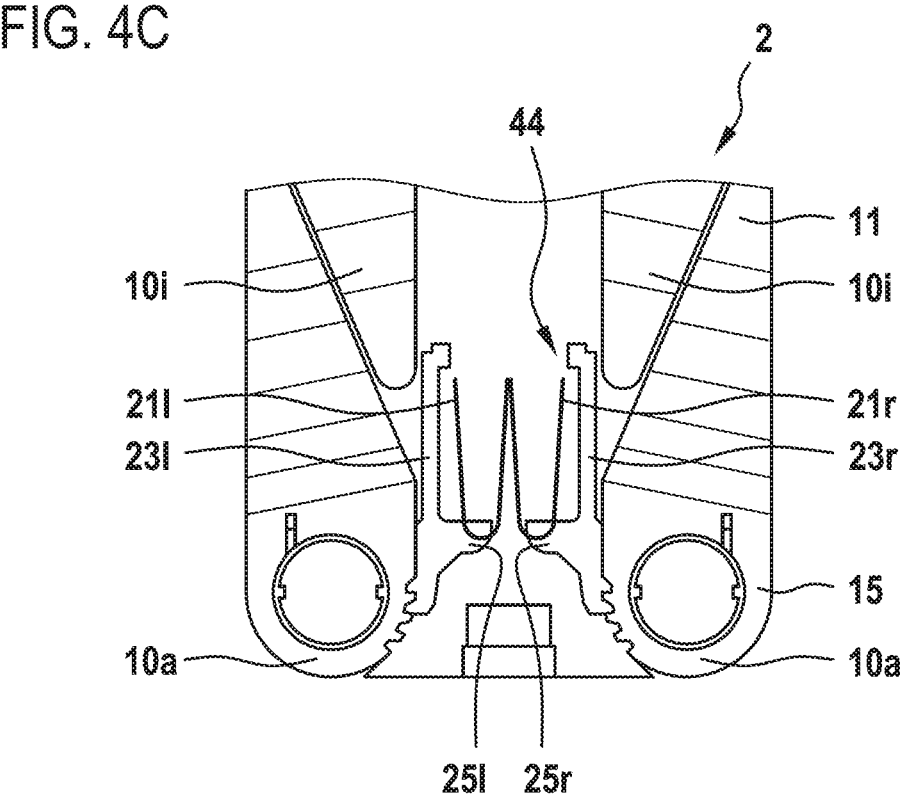
FIG. 4C shows a more detailed top view of a protective cover in the retracted state according to another exemplary embodiment of the disclosure.

FIG. 4C shows an additional exemplary embodiment of the locking unit 44 and the target points of the actuator. The levers 25r and 25l are arranged almost perpendicular to the bending beams 23r and 23l and the actuators 21r and 21l are arranged respectively in the area of the bending beams 23r and 23l, which allows a very compact design as it may be necessary for smaller mobile phones 1 or other electronic devices. Due to the overlapping arrangement of the damping elements 11, it is possible to keep the inner damping units 10i, which are closer to the longitudinal symmetry axis of the protective cover 2 when retracted, via the outer damping units 10a in the retracted position. This allows to waive the locking units 44 of the two inner damping units 10i, which reduces the required installation space and the costs.

Figure 4D:
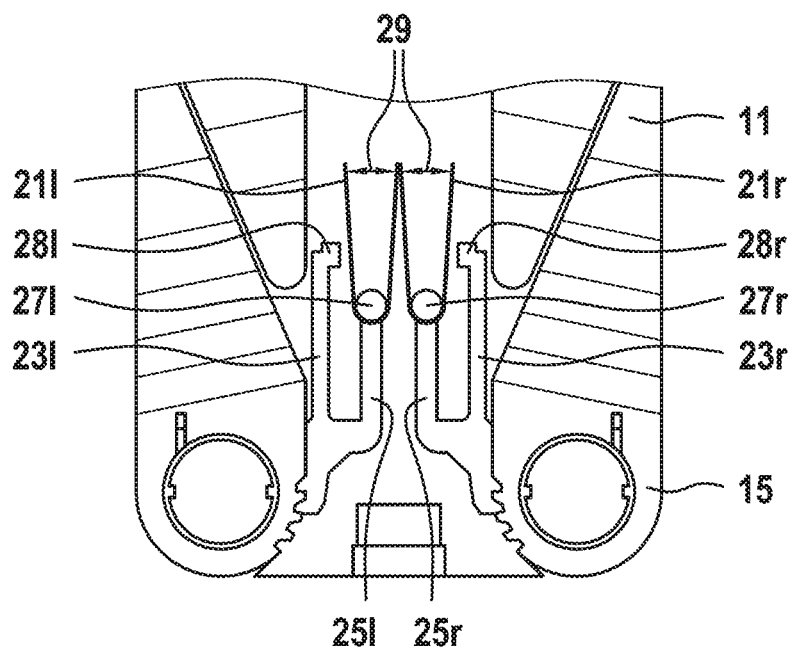
FIG. 4D shows a more detailed top view of a protective cover in the retracted state according to an exemplary embodiment of the disclosure.

FIG. 4D shows another exemplary embodiment of the lever 25 and the mounting points 27r and 27l of the actuator. The levers 25r and 25l with the mounting points 27r and 27l for the actuators 21r and 21l are extended in relation to the levers in FIG. 4C in the direction of the longitudinal axes of the bending beams 23r and 23l. This allows to arrange the actuators 21r and 21l in an area between the beam bearings 28r and 28l of the bending beams 23r and 23l. Therefore, more installation space is available for the actuator connection and larger bending angles 29 can be selected.

Figure 4E:
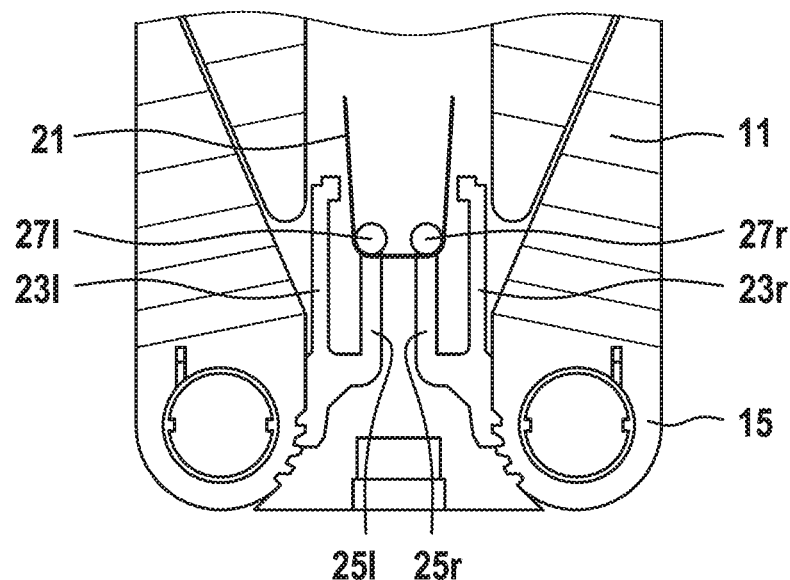
FIG. 4E shows a more detailed top view of a protective cover in the retracted state according to another exemplary embodiment of the disclosure.

FIG. 4E shows another exemplary embodiment, where the two levers 25r and 25l are actuated with only one actuator 21 instead of two actuators 21r and 21l. The one actuator 21 engages in the mounting points 27r and 27l for actuator 21 of the two levers 25r and 25l, in order to release the damping units 10.

Figure 5:
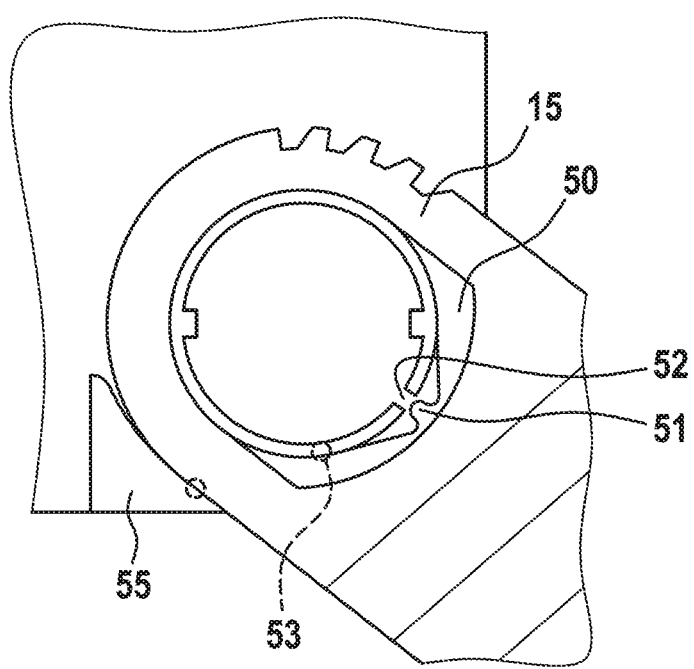
FIG. 5 shows an exemplary embodiment of the disclosure with further improved damping qualities.

FIG. 5 shows an exemplary embodiment of the disclosure with further improved damping features, which are especially configured for two directions of application of force on the damping unit in the event of an impact on the ground. In the first version, the force acts parallel to the mobile phone's 1 longitudinal axis on the damping unit, in the second version perpendicular to it.

The first version is addressed by the additional damper 50, which in the example shown is designed as a TPU element, which is inserted into the clamping section 15 and provided with a pin 51. If a force acts in parallel direction, the pin 51 slides into the corresponding recess 52, which prevents the damping unit from twisting. The pin 51 does not necessarily have to be arranged at the point shown, but must be adapted according to the application. Several pins can also be implemented. The ideal position of the pin is indicated in the figure with the reference number 53.

The additional damper 55 is provided for the case of vertical force being applied and forms a soft stop for the damping unit. The clamping section 15 is spared, as the force can be distributed better here. Therefore, the risk for the clamping section 15 to tear is reduced.

Pending the requirements of the installation space and boundary conditions, the protective cover can be equipped with different versions and a different number of actuators, whereby it can be adapted very flexibly.

It is understood that the foregoing description is that of the exemplary embodiments of the invention and that various changes and modifications may be made thereto without departing from the spirit and scope of the invention as defined in the appended claims.

LIST OF REFERENCE NUMERALS 1 electronic device, mobile phone
2 protective cover, housing
3 base frame
4 cover
5 mounting torsion spring
6 receptacle clamping section
10 damping unit
11 damping element
12 damper
13 spring
14 opening angle of damping unit
15 clamping section
16 recess for torsion spring
17 recess for locking device
18 notch, joint damper
19 torsion spring
20 release unit
21 actuator, SMA wire
22 actuator bearing
23, 23r, 23l bending beam
24 nose
25, 25r, 25l levers
26 towing arm
27 mounting point of SMA wire
28 beam bearing
29 bending angle of SMA wire, bend
30 flattening of SMA wire, bend
40 microcontroller
41 touch sensor
42 acceleration sensor
43 energy storage
44 locking unit
45 headpiece
47 camera

What is claimed is:

1. A housing for an electronic device, the housing comprising:
at least one damping unit movable between a retracted position and an extended position, the at least one damping unit including at least one damping element, a spring, and a damper;
at least one sensor configured to detect a fall of the electronic device;
a release unit configured to cause the at least one damping unit to move from the retracted position to the extended position upon detecting the fall of the electronic device, the release unit including an actuator being made of a shape memory alloy and configured to assume a first predefined shape and a second predefined shape, the first predefined shape being obtained by applying mechanical stress to the actuator and the second predefined shape being obtained by heating the actuator; and
the spring and the damper being configured to change a shape of the spring and of the damper when the at least one damping unit is moved from the retracted position to the extended position.

2. The housing according to claim 1, wherein each of the at least one damping unit includes two damping elements.

3. The housing according to claim 1, wherein each of the at least one damping element includes the spring and the damper arranged in two at least partially overlapping layers.

4. The housing according to claim 1, wherein the spring is connected to the damper in a form-fitting manner.

5. The housing according to claim 1, wherein the spring and the damper are movable relative to one another under friction.

6. The housing according to claim 1, wherein the spring is a leaf spring.

7. The housing according to claim 1, wherein the damper is made of a plastic material.

8. The housing according to claim 1, wherein the damper is made of a thermoplastic polyurethane.

9. The housing according to claim 1, wherein the damper has at least one notch arranged perpendicular to a longitudinal axis of the damper.

10. The housing according to claim 1, wherein the at least one damping element in the extended position is bent spirally.

11. The housing according to claim 1, wherein the housing includes four damping units.

12. The housing according to claim 1, wherein a damping is achieved by dissipating energy required to transform a volume of the damper as thermal energy.

13. The housing according to claim 1, wherein the at least one damping element is configured to absorb an energy of at least 1.5 joules.

14. The housing according to claim 1, wherein:
the at least one damping element has a free end and defines longitudinal axes,
the at least one damping element tapers towards the free end, and/or
in the retracted position, the longitudinal axes of the at least one damping element and of the housing are twisted against one another at an angle larger than 0°.

15. The housing according to claim 1, further comprising two actuator bearings, wherein:
the actuator is a wire,
the wire is connected to the two actuator bearings, and
the wire has a bend.

16. The housing according to claim 10, wherein the at least one damping element which is bent spirally has an opening angle between 120° and 180°.

17. The housing according to claim 10, wherein the at least one damping element which is bent spirally has an opening angle of 150°.

18. The housing according to claim 1, wherein the actuator is a piezo-electric actuator.

19. The housing according to claim 1, wherein the actuator is an electromagnetic actuator.

* * * * *